(12) United States Patent
Mizuno

(10) Patent No.: US 12,462,068 B2
(45) Date of Patent: Nov. 4, 2025

(54) COMPUTER-READABLE STORAGE MEDIUM, RELAY DEVICE, AND METHOD TO REDUCE PROCESSING LOAD FOR CHECKING DATA PROVIDED TO DEVICE

(71) Applicant: BROTHER KOGYO KABUSHIKI KAISHA, Nagoya (JP)

(72) Inventor: Akiko Mizuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 63 days.

(21) Appl. No.: 18/609,602

(22) Filed: Mar. 19, 2024

(65) Prior Publication Data
US 2024/0362369 A1  Oct. 31, 2024

(30) Foreign Application Priority Data
Apr. 26, 2023 (JP) ................. 2023-072295

(51) Int. Cl.
*G06F 21/00* (2013.01)
*G06F 21/54* (2013.01)
*G06F 21/64* (2013.01)

(52) U.S. Cl.
CPC ............. *G06F 21/64* (2013.01); *G06F 21/54* (2013.01)

(58) Field of Classification Search
CPC .................................. G06F 21/54; G06F 21/64
USPC ........................................................ 726/26
See application file for complete search history.

(56) References Cited

U.S. PATENT DOCUMENTS

| | | | | |
|---|---|---|---|---|
| 2015/0349964 A1* | 12/2015 | Watanabe | ............. | H04L 9/3268 713/156 |
| 2015/0349965 A1* | 12/2015 | Mori | .................. | H04L 63/0823 713/156 |
| 2021/0279018 A1* | 9/2021 | Kajitani | ................ | G06F 3/1288 |

FOREIGN PATENT DOCUMENTS

| | | | |
|---|---|---|---|
| JP | 2003-140969 A | 5/2003 |
| JP | 2018-5613 A | 1/2018 |

* cited by examiner

*Primary Examiner* — Josnel Jeudy
(74) *Attorney, Agent, or Firm* — Scully, Scott, Murphy & Presser, PC

(57) ABSTRACT

A non-transitory computer-readable storage medium stores computer-readable instructions executable by a controller of a relay device. The instructions are configured to, when executed by the controller, cause the relay device to receive, from a server, specific information for data provided to an external device, perform, based on the specific information, a verification process including determining whether verification information corresponding to the specific information is stored in a storage, thereby determining that the verification process has succeeded in response to determining that the verification information is stored, whereas determining that the verification process has failed in response to determining that the verification information is not stored, and determine whether the provided data corresponding to the specific information is normal or abnormal when the verification process has failed, whereas not determine whether the provided data is normal or abnormal when the verification process has succeeded.

12 Claims, 5 Drawing Sheets

COMPUTER-READABLE STORAGE MEDIUM, RELAY DEVICE, AND METHOD TO REDUCE PROCESSING LOAD FOR CHECKING DATA PROVIDED TO DEVICE

REFERENCE TO RELATED APPLICATIONS

This application claims priority from Japanese Patent Application No. 2023-072295 filed on Apr. 26, 2023. The entire content of the priority application is incorporated herein by reference.

BACKGROUND ART

A technology has been known in which abnormalities in data provided by a server are detected using hash values. In the known technology, the server sends, to a mobile terminal, data containing an encrypted contents list and a hash value generated from a contents list before encryption. Then, the mobile terminal decrypts the contents list, calculates a hash value from the decrypted contents list, and compares the calculated hash value with the hash value contained in the data received from the server, thereby detecting whether the contents list has been falsified.

SUMMARY

On the other hand, in a device management system to centrally manage a plurality of external devices such as image forming apparatuses, it is assumed that a server sends an instruction to download the same data to the plurality of external devices. In such a case, if the data to be downloaded to each external device is checked one by one, it may result in an increased processing load on the device management system.

Aspects of the present disclosure are advantageous for providing one or more improved techniques that make it possible to reduce a processing load for checking data provided to device(s).

According to aspects of the present disclosure, a non-transitory computer-readable storage medium is provided, which stores computer-readable instructions that are executable by a controller of a relay device. The relay device includes a communication interface configured to communicate with a server and an external device. The instructions are configured to, when executed by the controller, cause the relay device to receive specific information for data provided to the external device, from the server via the communication interface. The instructions are further configured to, when executed by the controller, cause the relay device to, based on the specific information, perform a verification process including determining whether verification information corresponding to the specific information is stored in a storage. The verification process succeeds when the verification information is stored in the storage. The verification process fails when the verification information is not stored in the storage. The instructions are further configured to, when executed by the controller, cause the relay device to determine whether it is to be determined whether the provided data corresponding to the specific information is normal or abnormal, depending on whether the verification process has succeeded or failed, before sending a particular instruction regarding the provided data. The instructions are further configured to, when executed by the controller, cause the relay device to, when the verification process has succeeded, send the particular instruction regarding the provided data to the external device via the communication interface without determining whether the provided data is normal or abnormal. The instructions are further configured to, when executed by the controller, cause the relay device to, when the verification process has failed, send the particular instruction regarding the provided data to the external device via the communication interface in response to determining that the provided data is normal.

According to aspects of the present disclosure, further provided is a relay device that includes a communication interface and a controller. The communication interface is configured to communicate with a server and an external device. The controller is configured to receive specific information for data provided to the external device, from the server via the communication interface. The controller is further configured to, based on the specific information, perform a verification process including determining whether verification information corresponding to the specific information is stored in a storage. The verification process succeeds when the verification information is stored in the storage. The verification process fails when the verification information is not stored in the storage. The controller is further configured to determine whether it is to be determined whether the provided data corresponding to the specific information is normal or abnormal, depending on whether the verification process has succeeded or failed, before sending a particular instruction regarding the provided data. The controller is further configured to, when the verification process has succeeded, send the particular instruction regarding the provided data to the external device via the communication interface without determining whether the provided data is normal or abnormal. The controller is further configured to, when the verification process has failed, send the particular instruction regarding the provided data to the external device via the communication interface in response to determining that the provided data is normal.

According to aspects of the present disclosure, further provided is a method implementable on a controller of a relay device. The relay device includes a communication interface configured to communicate with a server and an external device. The method includes receiving specific information for data provided to the external device, from the server via the communication interface. The method further includes performing, based on the specific information, a verification process including determining whether verification information corresponding to the specific information is stored in a storage. The verification process succeeds when the verification information is stored in the storage. The verification process fails when the verification information is not stored in the storage. The method further includes determining whether it is to be determined whether the provided data corresponding to the specific information is normal or abnormal, depending on whether the verification process has succeeded or failed, before sending a particular instruction regarding the provided data. The method further includes sending, when the verification process has succeeded, the particular instruction regarding the provided data to the external device via the communication interface without determining whether the provided data is normal or abnormal. The method further includes sending, when the verification process has failed, the particular instruction regarding the provided data to the external device via the communication interface in response to determining that the provided data is normal.

DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described.

1. Overview

Figure 1:
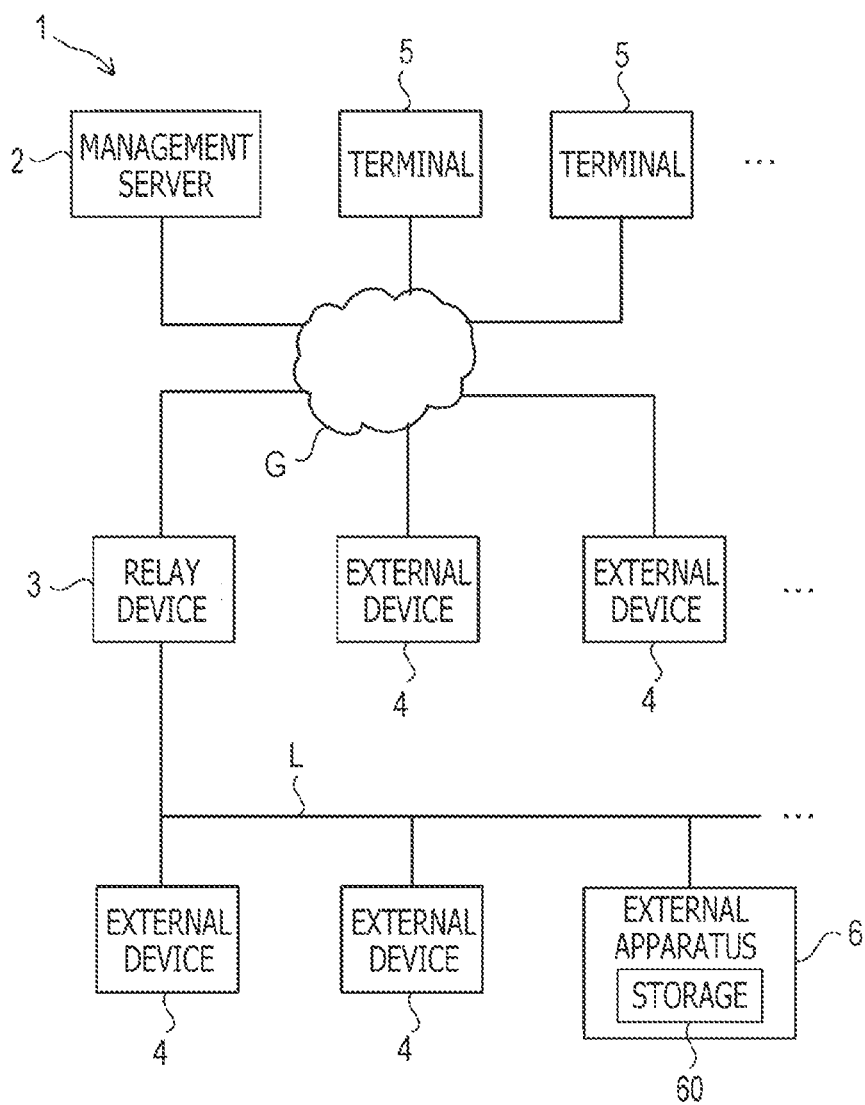
FIG. 1 is a block diagram schematically showing a configuration of a management system.

A management system 1 in the illustrative embodiment includes a management server 2, a relay server 3, a plurality of external devices 4, and a plurality of terminals 5 (see FIG. 1).

The management server 2 and the relay device 3 are connected with a global network G and communicable with each other via the global network G. The management server 2 and the relay device 3 are configured to communicate with each other using, for instance, HTTPS ("HTTPS" is an abbreviation for "Hypertext Transfer Protocol Secure"). The global network G may be any type of network, and practicable examples thereof may include, but are not limited to, the Internet.

The management system 1 may function, for instance, as a Mobile Device Management System (hereinafter referred to as the "MDM System"). Of course, practicable example functions of the management system 1 are not limited to the above. The management system 1 may be configured as various systems including the MDM System. The management server 2 is configured to communicate with the external devices 4 that are to be managed via the global network G, thereby managing the external devices 4. For instance, the management server 2 is owned by a provider of services of the MDM System, and the relay device 3 is owned by an administrator who manages the individual external devices 4 using the MDM System.

2. External Devices

Each external device 4 is configured to function as an image forming device. Each external device 4 has at least one of two functions, i.e., a printing function to print an image based on image data and a scanning function to read an image on a sheet and generate image data (see FIG. 2). Each external device 4 may be configured as a small portable device or as a stationary device.

For instance, each external device 4 is connected with the global network G and configured to communicate with the relay device 3 via the global network G. In another instance, each external device 4 may be connected with a local network L together with the relay device 3, and may be configured to communicate with the relay device 3 via the local network L. Practicable examples of the local network L may include, but are not limited to, a so-called intranet, a wired network, a wireless network such as a wireless LAN, and a mixed wired and wireless network. In yet another instance, each external device 4 may be configured to communicate with the relay device 3 via a wired communication line such as USB ("USB" is an abbreviation for "Universal Serial Bus") and/or a wireless communication line such as Bluetooth ("Bluetooth" is a registered trademark of Bluetooth SIG, Inc.).

Each external device 4 is communicable with the relay device 3, for instance, using HTTPS. Although the details will be described later, each external device 4 is configured to communicate with the management server 2 via the relay device 3. For instance, each external device 4 may be configured to make it impossible to communicate with the management server 2 without going through the relay device 3.

Figure 2:
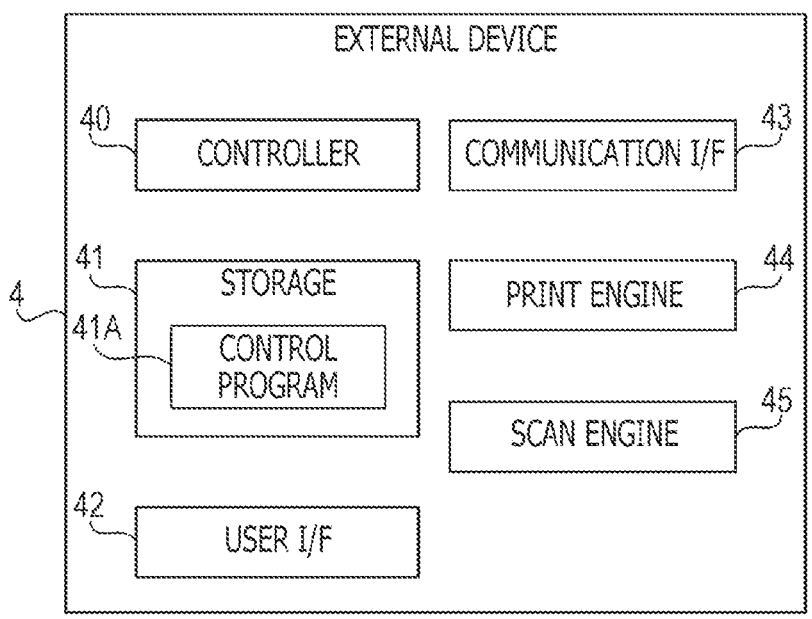
FIG. 2 is a block diagram schematically showing a configuration of each external device.

Each external device 4 includes a controller 40, a storage 41, a user I/F ("I/F" is an abbreviation for "interface") 42, and a communication I/F 43 (see FIG. 2). For instance, each external device 4 further includes a print engine 44 and a scan engine 45.

The controller 40 includes a CPU. The storage 41 includes one or more semiconductor memories such as a ROM, a RAM, an NVRAM ("NVRAM" is an abbreviation for "Non-Volatile Random Access Memory"), a flash memory, and an SSD ("SSD" is an abbreviation for "Solid State Drive"). In other words, each external device 4 has a computer including the CPU and the one or more semiconductor memories.

The storage 41 stores control programs 41A (i.e., firmware) for overall control of the corresponding external device 4. The controller 40 executes the control programs 41A, thereby achieving various functions of the corresponding external device 4. The various functions achieved by the controller 40 are not limited to functions realized by execution of the control programs 41A, but may be realized in whole or in part using one or more hardware elements.

The user I/F 42 includes one or more input devices (e.g., buttons and a touch panel) for receiving various inputs. The user I/F 42 further includes a display device such as an LCD panel or an LED display device.

The communication I/F 43 is configured to communicate with devices such as the relay device 3 via the global network G, the local network L, and/or communication lines such as USB and Bluetooth.

The print engine 44 is for realizing the aforementioned printing function. The scan engine 45 is for realizing the aforementioned scanning function. Of course, each external device 4 may have one of the print engine 44 and the scan engine 45.

3. Relay Device

The relay device 3 is configured to relay communications between the management server 2 and the external devices 4. Namely, each external device 4 is enabled to communicate with the management server 2 via the relay device 3. The relay device 3 includes a controller 30, a storage 31, a user I/F 32, and a communication I/F 33 (see FIG. 3).

The controller 30 includes a CPU. The storage 31 includes one or more semiconductor memories such as a ROM, a RAM, an NVRAM, a flash memory, and an SSD. The storage 31 may further include, for instance, an HDD ("HDD" is an abbreviation for "Hard Disk Drive"). Namely, the relay device 3 has a computer including the CPU and the one or more semiconductor memories.

The relay device 3 has various programs installed that include an OS 31A and a relay program 31B (the details thereof will be described later). The storage 31 is configured as a non-transitory computer-readable storage medium, and stores programs such as the OS 31A and the relay program 31B. The controller 30 is configured to execute the programs (e.g., the OS 31A and the relay program 31B) stored in the storage 31 configured as the non-transitory computer-readable storage medium, thereby achieving various functions of the relay device 3. The various functions achieved by the controller 30 are not limited to functions realized by executing the programs stored in the storage 31, but may be realized in whole or in part using one or more hardware elements.

For instance, the relay program 31B may be pre-installed in the relay device 3. In another instance, the relay program 31B may be provided as stored in a storage medium such as a DVD-ROM or a USB memory, and may be read from the storage medium by the relay device 3, to be installed in the relay device 3. In yet another instance, the relay program 31B may be downloaded via the global network G or the local network L, to be installed in the relay device 3.

The storage 31 further stores a file DB 31C and a device DB 31D. The file DB 31C and the device DB 31D will be described later. The storage 31 further stores an action DB that is a database for registering after-mentioned actions.

The user I/F 32 includes one or more input devices (e.g., a keyboard and a mouse) for receiving various inputs by the administrator. The user I/F 32 further includes a display device such as an LCD panel or an LED display device.

The communication I/F 33 is configured to communicate with devices such as the management server 2, for instance, via the global network G. The communication I/F 33 is further configured to communicate with devices such as the external devices 4 via the global network G, the local network L, and/or communication lines such as USB and Bluetooth.

The relay device 3 is further configured to communicate with an external apparatus 6, for instance, via the local network L (see FIG. 1). Of course, practicable example configurations of the relay device 3 are not limited to the above, but the relay device 3 may be configured to communicate with the external apparatus 6 via the global network G. The external apparatus 6 includes a computer, and a storage 60 to store various types of information.

4. Functions of Management System

The administrator of the external devices 4 accesses a specific site for management (hereinafter referred to as a "management site") on the management server 2 using, for instance, a Web browser installed in a device such as the terminals 5, thereby managing the external devices 4. Practicable examples of the terminals 5 may include, but are not limited to, mobile terminals and devices such as PCs with low portability. The management server 2 is configured to manage the external devices 4 by communicating with the external devices 4 via the relay device 3 in accordance with instructions received from the administrator via the management site. It is noted that a function of the relay device 3 to manage the external devices 4 is achieved by the controller 30 executing the relay program 31B.

For instance, the management system 1 has an action instructing function, a periodic monitoring function, and a self-check monitoring function. The action instructing function is a function to cause the external devices 4 to perform actions. Practicable examples of the actions may include, but are not limited to, updating various setting values, updating the control program 41A, installing certificates, downloading files, and sending status information.

The relay device 3 registers the actions to be executed by the external devices 4 in an action DB provided in the storage 31. An individual external device 4 polls the relay device 3 to determine whether there is an action to be executed by the individual external device 4. Specifically, for instance, each external device 4 sends a polling command to the relay device 3 at periodic timing (e.g., every 5 seconds). In response to receiving the polling command from an individual external device 4, the relay device 3 determines whether an action to be executed by the individual external device 4 is registered in the action DB. In response to determining that an action to be executed by the individual external device 4 is registered in the action DB, the relay device 3 sends to the individual external device 4 a command indicating the action to be executed.

The periodic monitoring function is a function in which the relay device 3 periodically obtains status information indicating a status of each external device 4 from each external device 4. Practicable examples of the status may include, but are not limited to, various setting values related to an image forming function, a remaining capacity of a battery 56, a remaining amount of colorant, a remaining number of sheets, a location of the corresponding external device 4, and a user name of the corresponding external device 4.

In addition, the status information includes a status indicating a version of the control program 41A for the corresponding external device 4 and a status (hereinafter referred to as a "startup flag") indicating that this is the first communication of the status information after the corresponding external device 4 is started up. Each external device 4 transmits the status information in response to each external device 4 being started up when it is powered on or in response to each external device 4 being restarted after the control program 41A is updated. In this case, the startup flag in the status information is set to an ON state. On the other hand, the startup flag in the status information transmitted for the second and subsequent times after each external device 4 is started or restarted is set to an OFF state.

In the storage 31 of the relay device 3, there is a management DB that stores the status information of each external device 4. In response to receiving the status information, the controller 30 of the relay device 3 updates the management DB based on the received status information.

The self-check monitoring function is such a function that when the status changes in an external device 4, the status information indicating the changed status is transmitted from the external device 4 to the relay device 3. In response to receiving the status information indicating the changed status, the controller 30 of the relay device 3 updates the management DB based on the received status information.

Thus, for instance, the administrator is allowed to access the management DB of the relay device 3 via the management site and check the status of each external device 4. Further, for instance, the administrator is allowed to make a request for an action to each external device 4 via the management site.

In addition to the above, the administrator may manage each external device 4 in substantially the same manner as when using the management server 2, by directly accessing the relay device 3 without going through the management server 2. Specifically, for instance, the administrator may manage each external device 4 by operating the user interface 34 of the relay device 3 or by accessing a specific site for management on the relay device 3 using a Web browser.

5. Update of Programs of External Devices

The management server 2 instructs each of a plurality of external devices 4 to update the control program 41A via the relay device 3 in accordance with instruction(s) received from the administrator of the external devices 4 via the management site. For instance, the above plurality of external devices 4 are the same or similar type of devices. The update of the control program 41A denotes replacing all or some of the current control programs 41A in the external devices 4 with the same new program (hereafter referred to as the "update program").

Specifically, the management server 2 sequentially sends to the relay device 3 a plurality of commands (hereinafter referred to as "update instructions") instructing the relay device 3 to update the control program 41A in each external device 4 via the global network G. In response to receiving an update instruction, the relay device 3 communicates with the external device 4 corresponding to the update instruction and sends an update instruction to cause the corresponding external device 4 to update the control program 41A. The external device 4 that has received the update instruction obtains the update program via the global network G or the local network L and updates the control program 41A with the obtained update program.

To update the control programs 41A of the plurality of external devices 4 by the management server 2, the file DB 31C and the device DB 31D stored in the storage 31 of the relay device 3 are used. Practicable example storage locations in which the file DB 31C and the device DB 31D may be stored are not limited to the storage 31 of the relay device 3. For instance, the file DB 31C and the device DB 31D may be stored in the storage 60 of the external apparatus 6 that is accessible by the relay device 3.

6. File DB

Figures 3, 4, 5:
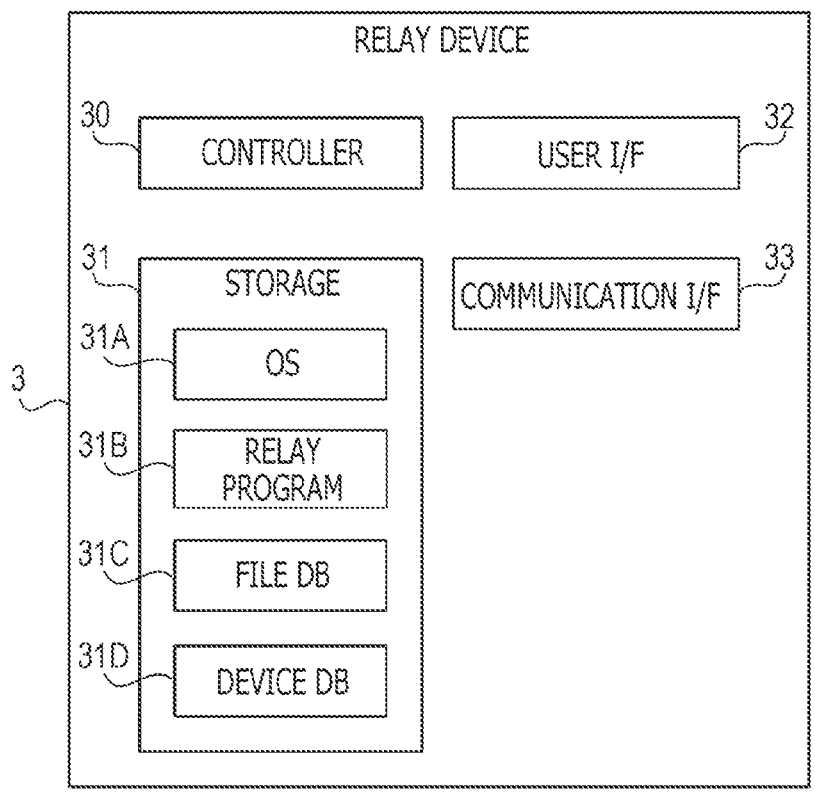
FIG. 3 is a block diagram schematically showing a configuration of a relay device.
FIG. 4 is a table showing a configuration of a file DB.
FIG. 5 is a table showing a configuration of a device DB.

The file DB 31C is a database for storing information about the update program. As shown in FIG. 4, the file DB 31C has a plurality of items including "File ID," "Data Type," "Hash Value," "Contents," "Generation Date," and "Update Date." Each record in the file DB 31C, i.e., each row in the table shown in FIG. 4 corresponds to an update program with which the control program 41A is replaced according to the update instruction.

In the table shown in FIG. 4, each field corresponding to "File ID" indicates a file ID that is identification information of the update program in the corresponding record. Each field corresponding to "Data Type" indicates a type of the control program 41A that is replaced with the update program in the corresponding record. For instance, in the illustrative embodiment, each field corresponding to "Data Type" indicates that the control program 41A is firmware. However, as will be described later, aspects of the present disclosure may be applied to updating programs and data other than firmware. In such cases, each field corresponding to "Data Type" is set as a field for information corresponding to a target to be updated.

Each field corresponding to "Hash Value" indicates specific information specifically provided for the update program in the corresponding record. In the illustrative embodiment, for instance, a hash value generated based on the update program is used as the specific information. The specific information in each field corresponding to "Hash Value" is used as verification information in an after-mentioned verification process.

Each field corresponding to "Contents" indicates information, such as a file name or a version, of the update program in the corresponding record. Each field corresponding to the "Generation Date" indicates when the control program 41A to be updated with the update program in the corresponding record was first released.

Each field corresponding to the "Update Date" indicates when the update program in the corresponding record was released. Hereafter, each record in the file DB 31C may be referred to as "file information." In addition, the information corresponding to each of the items "Data Type," "Contents," "Generation Date," and "Update Date" (i.e., the information corresponding to each of the items other than "File ID" and "Hash Value") in the file information may be referred to as "additional information."

Further, in the file DB 31C, a time stamp (not shown) indicating when each file information was generated is provided in association with each file information.

7. Device DB

The device DB 31D stores information on external devices 4 (hereafter, which may be referred to as "update-in-progress devices") in which a process to update the control program 41A is being performed according to an update instruction from the management server 2. As shown in FIG. 5, the device DB 31D has a plurality of items including "ID," "File ID," "Device ID," "Generation Date," and "Update Date." In addition, each record in the device DB 31D, i.e., each row in the table shown in FIG. 5 corresponds to an update-in-progress device.

In the table shown in FIG. 5, each field corresponding to "ID" indicates identification information in the corresponding record. Each field corresponding to "File ID" indicates a file ID of the update program to be installed in the update-in-progress device of the corresponding record.

Each field corresponding to "Device ID" indicates identification information (hereinafter referred to as a "device ID") of the update-in-progress device in the corresponding record. Each field corresponding to "Generation Date" indicates when the control program 41A to be updated in the update-in-progress device of the corresponding record was first released.

Each field corresponding to "Update Date" indicates when the update program used to update the update-in-progress device in the corresponding record was released. Hereinafter, each record in the device DB 31D may be referred to as "device information."

8. Update Relay Process

Figure 6A:
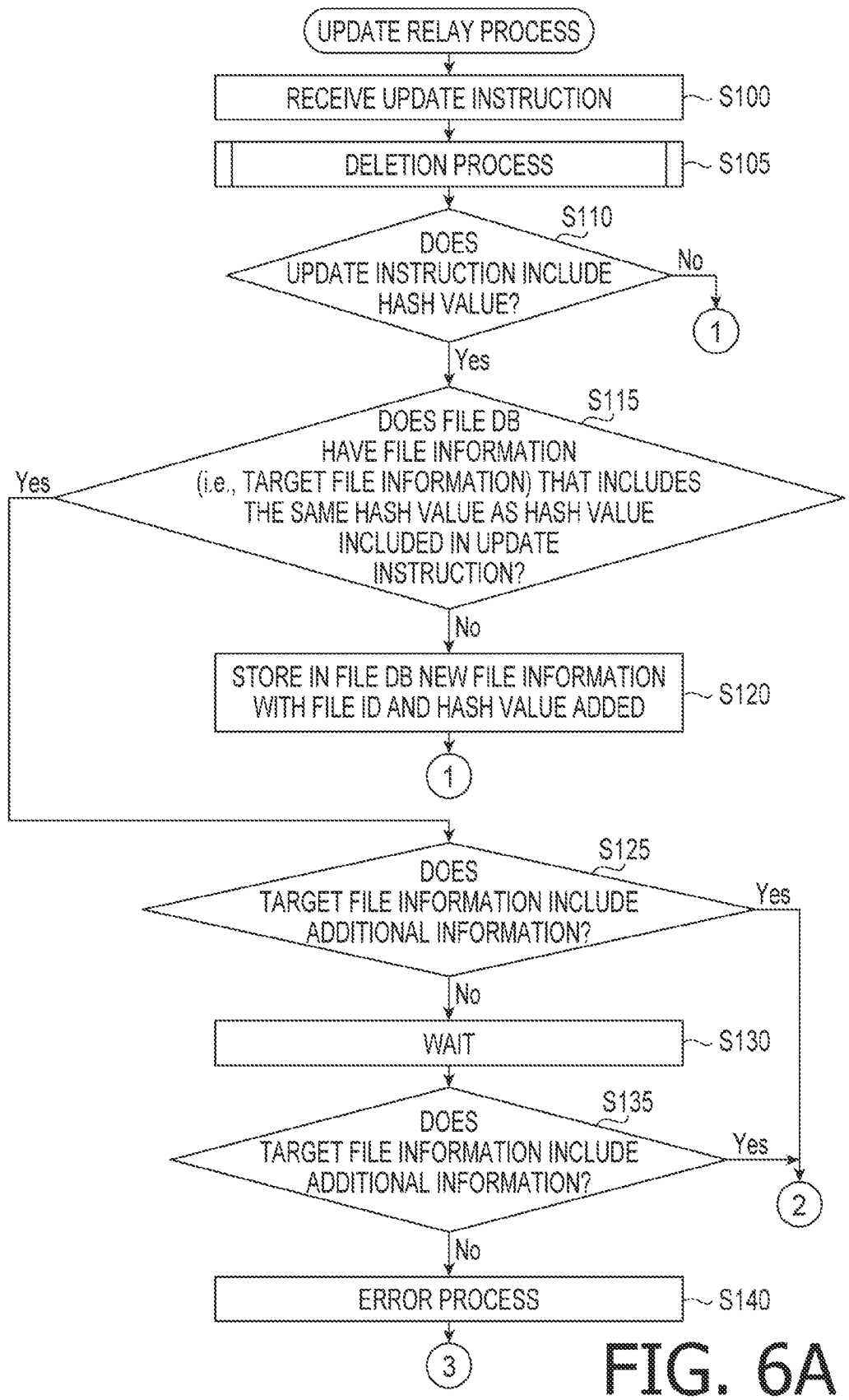
FIGS. 6A and 6B are flowcharts showing a procedure of an update relay process.
Figure 6B:
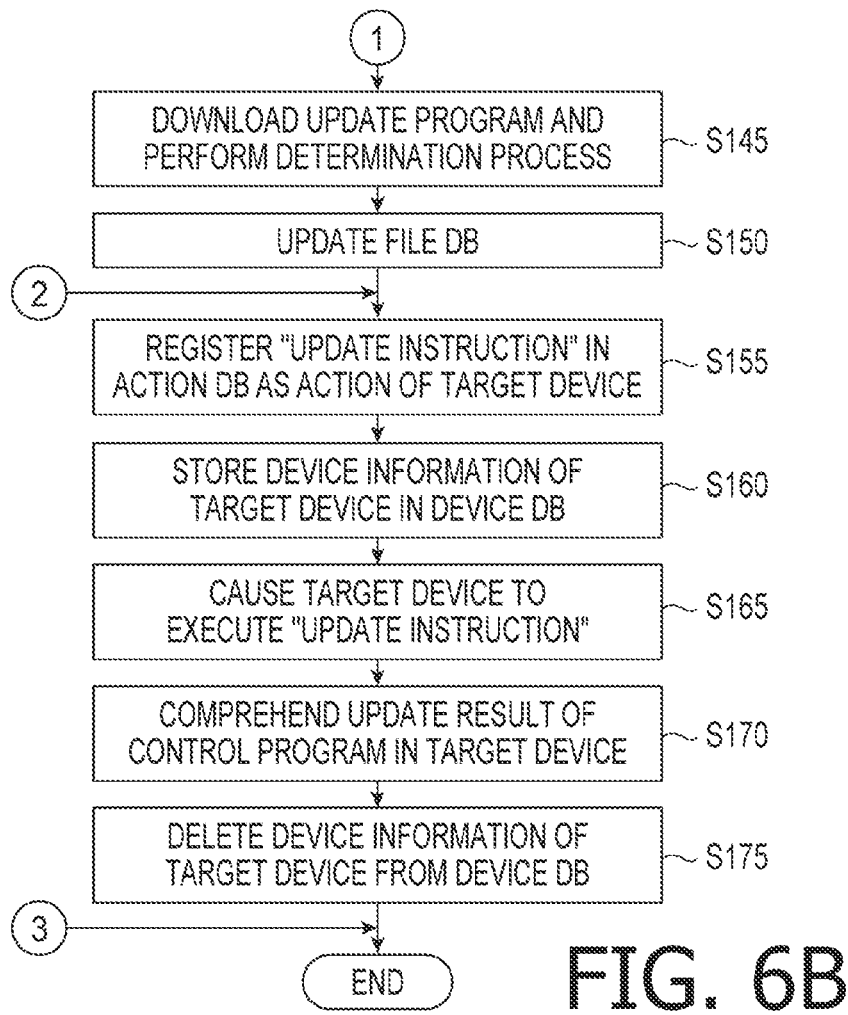

In response to receiving an update instruction from the management server 2, the relay device 3 performs an update relay process, in which the relay device 3 determines whether the update program is normal, and instructs external devices 4 specified by the update instruction, to update the control program 41A. The following describes the update relay process with reference to FIGS. 6A and 6B. The update relay process is achieved by the controller 30 of the relay device 3 operating according to the relay program 31B. In the following description, the subject that performs the process achieved by the controller 30 operating in accordance with the relay program 31B may be simply referred to as the "relay program 31B." Specifically, for instance, when the controller 30 executing the relay program 31B performs a particular process, it may be expressed as "the relay program 31B performs the particular process."

In S100, the relay program 31B (more exactly, the controller 30 executing the relay program 31B) receives an update instruction from the management server 2. The update instruction includes the device ID of an external device 4 (hereinafter referred to as a "target device") in which the control program 41A is to be updated, and server information (e.g., URL) for identifying a server that provides the update program. Further, the update instruction may include specific information (e.g., a hash value) of the update program corresponding to the update instruction. It is noted that whether the update instruction includes a hash value is determined according to, for instance, a selection made by the administrator.

Subsequently, in S105, the relay program 31B performs a deletion process, thereby deleting unnecessary file information contained in the file DB 31C. The deletion process will be described in detail later. After S105, the relay program 31B proceeds to S110.

In S110, the relay program 31B determines whether the hash value is included in the update instruction. In response to determining that the hash value is included in the update instruction (S110: Yes), the relay program 31B proceeds to S115. Meanwhile, in response to determining that the hash value is not included in the update instruction (S110: No), the relay program 31B proceeds to S145.

In S115, the relay program 31B performs, as part of a verification process, determining whether the file DB 31C has file information (hereafter referred to as "target file information") that includes the same hash value (i.e., verification information) as the hash value included in the update instruction. In response to determining that the file DB 31C has the target file information (S115: Yes), the relay program 31B proceeds to S125. Meanwhile, in response to determining that the file DB 31C does not have the target file information (S115: No), the relay program 31B proceeds to S120.

In S120, the relay program 31B adds, to the file DB 31C, new file information corresponding to the update program used to update the control program 41A according to the update instruction. In addition, the relay program 31B generates a file ID corresponding to the update program and adds the generated file ID to the new file information. For instance, the relay program 31B may use, as the file ID, the server information included in the update instruction. Further, the relay program 31B adds the hash value included in the update instruction to the new file information as verification information. Then, the relay program 31B proceeds to S145.

On the other hand, in S125, the relay program 31B performs, as part of the verification process, determining whether the target file information includes additional information. Hereinafter, determining whether the target file information includes the additional information may be referred to as "additional determination." In response to determining that the target file information includes the additional information (S125: Yes), the relay program 31B determines that the verification process has succeeded and proceeds to S155. Meanwhile, in response to determining that the target file information does not include the additional information (S125: No), the relay program 31B proceeds to S130.

In S130, the relay program 31B causes, as part of the verification process, the update relay process currently in progress to pause its own progress and wait for a particular waiting time (e.g., 30 seconds). After S125 and a lapse of the particular waiting time, the relay program 31B proceeds to S135.

In S135, the relay program 31B performs, as part of the verification process, substantially the same determination as in S125. Specifically, in S135, the relay program 31B determines whether the target file information includes the additional information. In response to determining that the target file information includes the additional information (S135: Yes), the relay program 31B determines that the verification program has succeeded, and proceeds to S155. Meanwhile, in response to determining that the target file information does not include the additional information (S135: No), the relay program 31B proceeds to S140. Namely, in the verification process, when the negative determination is made in the first additional determination (S125: No), another additional determination is made (S135). However, practicable examples of how to make the additional determination(s) in the verification process are not limited to this, but two or more additional determinations may be made in substantially the same manner.

In S140, the relay program 31B considers that the update program used for the update instruction has been determined to be abnormal in an after-mentioned determination process, and performs an error process. After the error process, the relay program 31B terminates the update relay process.

On the other hand, in S145, the relay program 31B accesses the server using the server information included in the update instruction and downloads the update program from the server. Then, the relay program 31B performs the determination process for the downloaded update program to determine whether the update program is normal or abnormal. Specifically, for instance, in the determination process, the update program may be determined to be abnormal when the update program does not conform to the target device. Further, in the determination process, the version of the update program may be identified. In response to determining that the update program is determined to be normal in the determination process, the relay program 31B executes S150 and the subsequent processes. Meanwhile, in response to determining that the update program is determined to be abnormal in the determination process, the relay program 31B may terminate the update relay process.

Subsequently, in S150, based on the downloaded update program, the relay program 31B identifies the additional information (i.e., the data type, the contents, the generation date, and the update date) of the update program. The relay program 31B then stores the identified additional information in the file DB 31C as part of the file information corresponding to the update program.

Specifically, when the file DB 31C has file information corresponding to the downloaded update program, the relay program 31B adds the identified additional information to the file information. Meanwhile, when the file DB 31C does not have the file information corresponding to the downloaded update program, the relay program 31B adds new file information corresponding to the update program to the file DB 31C. In this case, the relay program 31B generates a file ID corresponding to the update program, adds the generated file ID to the new file information, and adds the identified additional information to the new file information.

Subsequently, in S155, the relay program 31B registers the "update instruction" to update the control program 41A of the target device in the action DB as an action of the target device. After S155, the relay program 31B proceeds to S160.

In S160, the relay program 31B generates device information of the target device, and stores the generated device information in the device DB 31D. The device information includes the ID, and further includes the file ID, the generation date, and the update date in the file information corresponding to the update program.

On the other hand, the controller 40 of an individual external device 4 sends a polling command to the relay device 3 to check whether there is an action to be executed by the individual external device 4. When the individual external device 4 is the target device, and the "update instruction" is registered in the action DB as an action of the target device, the relay program 31B sends a command corresponding to the "update instruction" to the target device. At this time, the relay program 31B also sends to the target device the server information of the server providing the update program. Thereby, the relay program 31B causes the target device to execute the action "update instruction" (S165).

The controller 40 of the target device that has received the above command sends, to the relay program 31B, a command instructing the relay program 31B to delete the action corresponding to the above command from the action DB. The relay program 31B that has received the command deletes the action from the action DB.

The controller 40 of the target device downloads the update program from the server identified by the server information and updates the control program 41A with the downloaded update program. At this time, the controller 40 sends, to the relay device 3, information indicating whether the update program has been successfully downloaded and whether the update of the control program 41A has been started.

When the update of the control program 41A has been completed, the target device is restarted. In response to the target device being restarted, the controller 40 of the target device sends the status information to the relay program 31B. The startup flag in the status information first sent after the restart of the target device is set to the ON state. In addition, the status information sent after the restart of the target device includes the version of the update program.

On the other hand, the relay program 31B comprehends an update result of the control program 41A in the target device from various types of information received from the target device after transmission of the "update instruction" (S170). The relay program 31B then updates the management DB, saves the update result of the control program 41A in the target device, and sends the updated result to the management server 2.

Specifically, the relay program 31B determines that the target device has failed to update the control program 41A, when the target device has failed to download the update program. In addition, in response to receiving from the target device the status information that the startup flag is in the ON state, the relay program 31B grasps the version of the update program included in the status information. Further, the relay program 31B accesses the file DB 31C and obtains the version of the update program that is indicated by "Contents" in the file information corresponding to the update program. Furthermore, the relay program 31B compares the version of the update program as received with the version of the update program as obtained from the file DB 31C. When these versions match with each other, the relay program 31B determines that the update of the control program 41A has succeeded. When these versions do not match with each other, the relay program 31B determines that the update of the control program 41A has failed.

Subsequently, in S175, the relay program 31B deletes the device information corresponding to the target device from the device DB 31D. Thereafter, the relay program 31B terminates the update relay process.

9. Deletion Process

Figure 7:
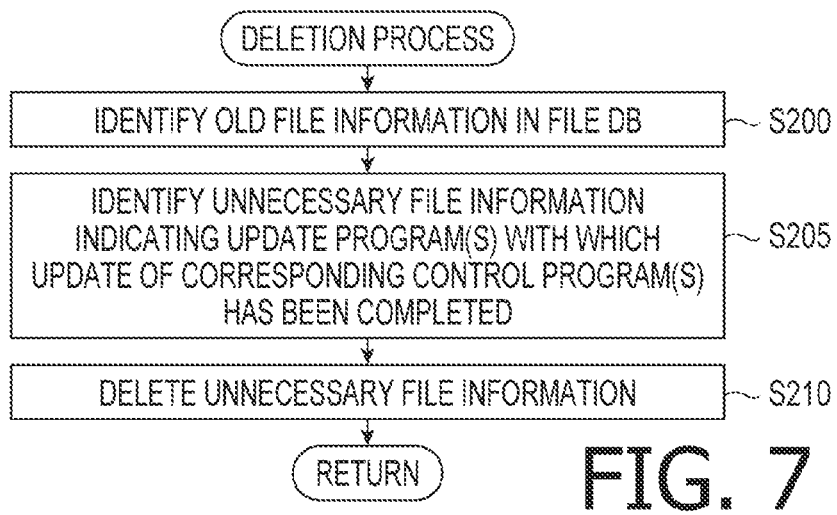
FIG. 7 is a flowchart showing a procedure of a deletion process.

Next, the deletion process to be performed in S105 of the update relay process will be described with reference to FIG. 7.

In S200, based on the time stamp in the file DB 31C, the relay program 31B identifies old file information of which a particular storage time (e.g., one hour) has elapsed since it was generated, from among one or more pieces of file information stored in the file DB 31C.

Subsequently, in S205, the relay program 31B determines, based on the device DB 31D, whether each file information identified in S200 is no longer needed after the update has been completed of the control program 41A of the corresponding external device 4 with the update program corresponding to each identified file information.

Specifically, for each of the file information identified in S200, the relay program 31B determines whether the device information having the file ID of each identified file information is included in the device DB 31D. For instance, when an affirmative determination is made for an individual piece (hereinafter referred to as "individual file information") of the file information identified in S200, i.e., when it is determined that the device information having the file ID of the individual file information is included in the device DB 31D, it is considered that there is an update-in-progress device for which the process to update the control program 41A is being performed using the update program corresponding to the individual file information. Meanwhile, when a negative determination is made for the individual file information, i.e., when it is determined that the device information having the file ID of the individual file information is not included in the device DB 31D, it is considered that there is not an update-in-progress device for which the process to update the control program 41A is being performed using the update program corresponding to the individual file information and that the update has been completed of the control program 41A of the corresponding external device 4 with the update program corresponding to the individual file information. Therefore, in this case, the relay program 31B determines that the individual file information for which the negative determination is made is unnecessary.

In S210, the relay program 31B deletes the file information determined to be unnecessary from the file DB 31C. Thereafter, the relay program 31B terminates the deletion process.

10. Advantageous Effects

In the update relay process in the aforementioned illustrative embodiment, when the hash value, which is the specific information for the update program, is stored in the file DB 31C, the determination process for the update program is not performed. Therefore, it is possible to reduce a processing load on the management system 1 for checking the data provided to the external devices 4.

When the hash value as the specific information for the update program is not stored in the file DB 31C, the hash value is stored in the file DB 31C of the relay device 3, and then the determination process for the update program is performed. Thus, it is possible to avoid the determination process from being performed again for the update program for which the determination process has already been performed.

In the verification process, the hash value of the update program is used as the specific information and the verification information. Therefore, it is possible to suitably perform the verification process.

Further, the file DB 31C is stored in the storage 31 of the relay device 3 and/or in the storage 60 of the external apparatus 6 that is accessible by the relay program 31B. Therefore, it is possible to suitably perform the verification process.

When the downloaded update program is determined to be normal in the determination process, the additional information of the update program is stored in the file DB 31C as the file information. When the file information including the hash value of the update program in the file DB 31C has the additional information, it is considered that the verification process has succeeded. Thus, it is possible to avoid the determination process from being performed again for the update program determined to be normal in the determination program.

In the verification process, when the negative determination is made in the first execution of the additional determination, the additional determination is again executed after a lapse of the waiting time. Therefore, even if while the determination process is being executed in response to receipt of a first update instruction for an update program, the verification process is started in response to receipt of another update instruction for the same update program, it is possible to execute the additional determination after waiting for the determination process in execution to be completed. Therefore, it is possible to more certainly avoid the determination process from being performed again for the update program determined to be normal in the determination process.

When the verification process has failed, in response to determining that the update program is normal in the determination process, the relay device 3 sends an update instruction to update the control program 41A to the corresponding external device 4. When the verification process has succeeded, the relay device 3 sends an update instruction to update the control program 41A to the corresponding external device 4 without performing the determination process. Therefore, when the relay device 3 sequentially sends update instructions to update the control programs 41A to a plurality of external devices 4, it is possible to avoid the determination process from being performed one by one for every update program.

The relay device 3 performs the deletion process in response to receiving an update instruction. Thereby, it is possible to delete, from the file DB 31C, file information regarding each update program with which the update of the control program 41A of the corresponding external device 4 has been completed, among old file information stored in the file DB 31C. Thus, it is possible to delete unnecessary data from the file DB 31C.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

11. Modifications

In the aforementioned illustrative embodiment, each external device 4 may be a device other than an image forming device. In the aforementioned illustrative embodiment, the control program 41A of each external device 4 is firmware as an example. However, programs (e.g., applications and an OS) other than firmware and data (e.g., databases) other than programs in each external device 4 may be updated according to update instructions from the management server 2 in substantially the same manner as in the aforementioned illustrative embodiment.

In the aforementioned illustrative embodiment, the hash value of the update program is used as the specific information. However, for instance, a serial number of the update program may be used as the specific information. In the update relay process, the verification process succeeds when the file DB 31C has target file information including the verification information that is the same as the specific information included in the update instruction. However, practicable example cases in which the verification process succeeds are not limited to this. For instance, the verification process may succeed when the file DB 31C has target file information including the verification information that is not the same as the specific information included in the update instruction, but has a particular correspondence relationship with the specific information.

In the update relay process, the relay program 31B may send a result of the verification process using the hash value included in the update instruction or a result of the determination process performed in response to receipt of the update instruction to an external device 4 indicated by the device ID included in the update instruction.

The additional determination in the verification process may be omitted. Specifically, for instance, in the verification process in the update relay process, the steps S120 to S140 may be omitted. In this case, the relay program 31B may proceed to S155 in response to making the affirmative determination in S115 (S115: Yes). Further, the relay program 31B may proceed to S145 in response to making the negative determination in S115 (S115: No). Even in such a case, it is possible to reduce the processing load on the management system 1 for checking the data provided to the external devices 4.

Each external device 4 sends a polling command to the relay device 3. In this case, the relay device 3 sends to an individual external device 4 a command indicating an action to be executed by the individual external device 4, in response to determining that the action to be executed by the individual external device 4 is registered in the action DB. However, practicable example methods for sending to an individual external device 4 a command indicating an action to be executed by the individual external device 4 are not limited to this, but may include various methods.

A plurality of functions of a single element in the aforementioned illustrative embodiment may be realized by a plurality of elements. A single function of a single element in the aforementioned illustrative embodiment may be realized by a plurality of elements. A plurality of functions of a plurality of elements in the aforementioned illustrative embodiment may be realized by a single element. A single function achieved by a plurality of elements in the aforementioned illustrative embodiment may be realized by a single element. A part of the configuration of the management system 1 in the aforementioned illustrative embodiment may be omitted. At least part of the configuration of the management system 1 in the aforementioned illustrative embodiment may be added to or used as a replacement for a configuration in the aforementioned modifications according to aspects of the present disclosure.

Aspects of the present disclosure may be realized in various forms such as a non-transitory computer-readable storage medium (e.g., a semiconductor memory or a hard disk drive) storing the relay program 31B, and a method corresponding to the update relay process, in addition to the relay device 3 described above.

The following shows examples of associations between elements illustrated in the aforementioned illustrative embodiment(s) and modification(s), and elements claimed according to aspects of the present disclosure. For instance, the relay device 3 may be an example of a "relay device" according to aspects of the present disclosure. The controller 30 may be an example of a "controller" according to aspects of the present disclosure. The communication I/F 33 may be an example of a "communication interface" according to aspects of the present disclosure. The storage 31 of the relay device 3 and the storage 60 of the external apparatus 6 may be included in examples of a "storage" according to aspects of the present disclosure. The storage 31 storing the relay program 31B may be an example of a "non-transitory computer-readable storage medium" storing "computer-readable instructions" according to aspects of the present disclosure. The management server 2 may be an example of a "server" according to aspects of the present disclosure. The external devices 4 may be included in examples of an "external device" and a "particular external device" according to aspects of the present disclosure. The external apparatus 6 may be an example of an "external apparatus" according to aspects of the present disclosure. The update program used to update the control program 41A may be an example of "provided data (i.e., data provided to the external device)" according to aspects of the present disclosure.

What is claimed is:

1. A non-transitory computer-readable storage medium storing computer-readable instructions that are executable by a controller of a relay device comprising a communication interface configured to communicate with a server and an external device, the instructions being configured to, when executed by the controller, cause the relay device to:
receive specific information for data provided to the external device, from the server via the communication interface;
based on the specific information, perform a verification process including determining whether verification information corresponding to the specific information is stored in a storage, wherein the verification process succeeds when the verification information is stored in the storage, whereas the verification process fails when the verification information is not stored in the storage;
determine whether it is to be determined whether the provided data corresponding to the specific information is normal or abnormal, depending on whether the verification process has succeeded or failed, before sending a particular instruction regarding the provided data; and
when the verification process has succeeded, send the particular instruction regarding the provided data to the external device via the communication interface without determining whether the provided data is normal or abnormal, whereas when the verification process has failed, send the particular instruction regarding the provided data to the external device via the communication interface in response to determining that the provided data is normal.

2. The non-transitory computer-readable storage medium according to claim 1,
wherein the instructions are further configured to, when executed by the controller, cause the relay device to:
store the verification information corresponding to the specific information in the storage when the verification process has failed.

3. The non-transitory computer-readable storage medium according to claim 2,
wherein the specific information includes a hash value generated based on the provided data corresponding to the specific information, and
wherein the verification information corresponding to the specific information is a hash value that is the same as the hash value included in the specific information.

4. The non-transitory computer-readable storage medium according to claim 1,
wherein the relay device further comprises the storage.

5. The non-transitory computer-readable storage medium according to claim 1,
wherein the storage is provided in an external apparatus configured to communicate with the relay device via the communication interface.

6. The non-transitory computer-readable storage medium according to claim 2,
wherein the instructions are further configured to, when executed by the controller, cause the relay device to:
based on the specific information, perform the verification process further including determining whether additional information regarding the provided data corresponding to the specific information is stored in the storage, in response to determining that the verification information corresponding to the specific information is stored in the storage, wherein the verification process succeeds when the additional information is stored in the storage, whereas the verification process fails when the additional information is not stored in the storage;
when the verification process has failed, determine whether the provided data is normal or abnormal; and
in response to determining that the provided data is normal, store the additional information regarding the provided data corresponding to the specific information in the storage.

7. The non-transitory computer-readable storage medium according to claim 6,
wherein the instructions are further configured to, when executed by the controller, cause the relay device to:
based on the specific information, perform the verification process further including:

waiting for a particular waiting time in response to determining that the additional information regarding the provided data corresponding to the specific information is not stored in the storage, after determining that the verification information corresponding to the specific information is stored in the storage; and after waiting for the particular waiting time, again determining whether the additional information regarding the provided data corresponding to the specific information is stored in the storage, thereby determining that the verification process has succeeded in response to determining that the additional information is stored in the storage, whereas determining that the verification process has failed in response to determining that the additional information is not stored in the storage.

8. The non-transitory computer-readable storage medium according to claim 1, wherein the instructions are further configured to, when executed by the controller, cause the relay device to:

send an update instruction to update a program of the external device with the provided data to the external device via the communication interface, when the verification process has succeeded, or when the verification process has failed but the provided data is determined to be normal.

9. The non-transitory computer-readable storage medium according to claim 8, wherein the instructions are further configured to, when executed by the controller, cause the relay device to:

when the verification process has failed, store the verification information corresponding to the specific information based on which the verification process has been performed;

identify an update-in-progress device that is a particular external device in which a process to update a program thereof is being performed; and delete, from among the verification information stored in the storage, specific verification information of which a particular storage time has elapsed since the specific verification information was stored in the storage, the specific verification information corresponding to provided data that is different from provided data used to update the program of the update-in-progress device.

10. A relay device comprising:

a communication interface configured to communicate with a server and an external device; and a controller comprising hardware configured to:

receive specific information for data provided to the external device, from the server via the communication interface;

based on the specific information, perform a verification process including determining whether verification information corresponding to the specific information is stored in a storage, wherein the verification process succeeds when the verification information is stored in the storage, whereas the verification process fails when the verification information is not stored in the storage;

determine whether it is to be determined whether the provided data corresponding to the specific information is normal or abnormal, depending on whether the verification process has succeeded or failed, before sending a particular instruction regarding the provided data; and when the verification process has succeeded, send the particular instruction regarding the provided data to the external device via the communication interface without determining whether the provided data is normal or abnormal, whereas when the verification process has failed, send the particular instruction regarding the provided data to the external device via the communication interface in response to determining that the provided data is normal.

11. The relay device according to claim 10, further comprising a non-transitory computer-readable storage medium storing computer-readable instructions configured to, when executed by the controller, cause the controller to:

receive the specific information for the provided data from the server via the communication interface;

based on the specific information, perform the verification process including determining whether verification information corresponding to the specific information is stored in the storage, wherein the verification process succeeds when the verification information is stored in the storage, whereas the verification process fails when the verification information is not stored in the storage;

determine whether it is to be determined whether the provided data is normal or abnormal, depending on whether the verification process has succeeded or failed, before sending the particular instruction regarding the provided data; and when the verification process has succeeded, send the particular instruction regarding the provided data to the external device via the communication interface without determining whether the provided data is normal or abnormal, whereas when the verification process has failed, send the particular instruction regarding the provided data to the external device via the communication interface in response to determining that the provided data is normal.

12. A method implementable on a controller of a relay device comprising a communication interface configured to communicate with a server and an external device, the method comprising:

receiving specific information for data provided to the external device, from the server via the communication interface;

based on the specific information, performing a verification process including determining whether verification information corresponding to the specific information is stored in a storage, wherein the verification process succeeds when the verification information is stored in the storage, whereas the verification process fails when the verification information is not stored in the storage;

determining whether it is to be determined whether the provided data corresponding to the specific information is normal or abnormal, depending on whether the verification process has succeeded or failed, before sending a particular instruction regarding the provided data; and when the verification process has succeeded, sending the particular instruction regarding the provided data to the external device via the communication interface without determining whether the provided data is normal or abnormal, whereas when the verification process has failed, sending the particular instruction regarding the provided data to the external device via the communication interface in response to determining that the provided data is normal.

* * * * *